United States Patent
Terada et al.

(10) Patent No.: US 10,173,729 B2
(45) Date of Patent: Jan. 8, 2019

(54) VEHICLE PILLAR STRUCTURE

(71) Applicant: TOYOTA JIDOSHA KABUSHIKI KAISHA, Toyota-shi (JP)

(72) Inventors: Shin Terada, Toyota (JP); Yoshinori Yamada, Nagakute (JP); Chikashi Takeichi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/411,016

(22) Filed: Jan. 20, 2017

(65) Prior Publication Data

US 2017/0253275 A1    Sep. 7, 2017

(30) Foreign Application Priority Data

Mar. 4, 2016 (JP) .................................. 2016-042365

(51) Int. Cl.
*B62D 25/04* (2006.01)
*B62D 29/04* (2006.01)

(52) U.S. Cl.
CPC ............ *B62D 25/04* (2013.01); *B62D 29/04* (2013.01)

(58) Field of Classification Search
CPC ........... B62D 25/04; B62D 29/43; B60J 1/004
See application file for complete search history.

(56) References Cited

U.S. PATENT DOCUMENTS

| | | | |
|---|---|---|---|
| 2002/0089215 A1 | 7/2002 | Frasher et al. | |
| 2015/0151796 A1* | 6/2015 | Berger | B29C 70/68 |
| | | | 296/193.06 |
| 2017/0183039 A1 | 6/2017 | Toyota et al. | |

FOREIGN PATENT DOCUMENTS

| | | |
|---|---|---|
| JP | 2006-273057 | 10/2006 |
| JP | 2017-114410 A | 6/2017 |

* cited by examiner

*Primary Examiner* — D Glenn Dayoan
*Assistant Examiner* — Melissa A Black
(74) *Attorney, Agent, or Firm* — Oblon, McClelland, Maier & Neustadt, L.L.P.

(57) ABSTRACT

The present disclosure provides a vehicle pillar structure including: a pillar portion extending along a vehicle transverse direction outer side end portion of a windshield glass, the pillar portion including: a pair of side portions configuring a vehicle transverse direction inner side and outer side portion of the pillar portion and being configured by an opaque material, and transparent portions provided between the pair of side portions and being configured by a transparent material; reinforcing portions configured by an opaque material, spanning between the pair of side portions, formed integrally with the transparent portions, and reinforcing the pillar portion; and upper surfaces and lower surfaces of the reinforcing portions extending along a vehicle longitudinal direction, or inclining toward a vehicle lower side on progression towards a vehicle longitudinal direction outer side, as seen in a cross-section viewed from a vehicle transverse direction inner side.

4 Claims, 6 Drawing Sheets

VEHICLE PILLAR STRUCTURE

CROSS-REFERENCE TO RELATED APPLICATION

This application claims priority under 35 USC 119 from Japanese Patent Application No. 2016-042365 filed Mar. 4, 2016, the disclosure of which is incorporated by reference herein.

BACKGROUND

Technical Field

The present disclosure relates to a vehicle pillar structure.

Related Art

In the pillar structure disclosed in Japanese Patent Application Laid-Open (JP-A) No. 2006-273057, a front pillar is configured to include a pillar portion that is made of a transparent material, and a front pillar frame that holds the pillar portion. The front pillar frame is configured to include a front pillar inner panel and a front pillar outer panel that are substantially frame-shaped. Moreover, the front pillar inner panel has reinforcing walls (reinforcing portions) that are bridged between a pair of vertical walls at the front pillar inner panel. Due thereto, the front pillar inner panel can be reinforced, and the pillar portion can be reinforced.

However, in the above-described pillar structure, the front pillar inner panel has the reinforcing walls that are bridged between the pair of vertical walls as described above. Therefore, when the driver views the vehicle outer side through the pillar portion, regions at which the field of view of the driver is blocked by the reinforcing walls. Therefore, in this pillar structure, there is room for improvement with regard to the point of improving the visibility of the driver though the pillar portion.

SUMMARY

The present disclosure provides a vehicle pillar structure that may improve the visibility of the driver through a pillar portion while reinforcing the pillar portion.

A vehicle pillar structure of the first aspect includes: a pillar portion extending along a vehicle transverse direction outer side end portion of a windshield glass, the pillar portion including: a pair of side portions configuring a vehicle transverse direction inner side portion and a vehicle transverse direction outer side portion of the pillar portion and being configured by an opaque material, and transparent portions configuring portions of the pillar portion between the pair of side portions and being configured by a transparent material; reinforcing portions configured by an opaque material, spanning between the pair of side portions, formed integrally with the transparent portions, and reinforcing the pillar portion; and upper surfaces and lower surfaces of the reinforcing portions extending along a vehicle longitudinal direction, or inclining toward a vehicle lower side on progression towards a vehicle longitudinal direction outer side, as seen in a cross-section viewed from a vehicle transverse direction inner side.

In the vehicle pillar structure of the first aspect, the pillar portion extends along the vehicle transverse direction outer side end portion of the windshield glass. Further, the pair of side portions, that configures the vehicle transverse direction inner side portion and the vehicle transverse direction outer side portion of the pillar portion, are configured by an opaque material. The portions between the pair of side portions are transparent portions that are configured by a transparent material. Further, the reinforcing portions that are configured by an opaque material are bridged between the pair of side portions of the pillar portion, and are formed integrally with the transparent portion. Due thereto, the pillar portion is reinforced by the reinforcing portions. Note that, in the following explanation, for convenience, a pillar portion, that extends along a vehicle transverse direction outer side end portion of the windshield glass that is disposed at the front portion of the vehicle cabin, is called a front pillar portion, and a pillar portion, that extends along a vehicle transverse direction outer side end portion of the windshield glass that is disposed at the rear portion of the vehicle cabin, is called a rear pillar portion.

Here, as seen in a cross-section viewed from the vehicle transverse direction inner side, the upper surfaces and the lower surfaces of the reinforcing portions extend along the vehicle longitudinal direction. Therefore, as seen in a cross-section viewed from the vehicle transverse direction inner side, as compared with a case in which the upper surface and the lower surface of the reinforcing portion were to be inclined toward the vehicle upper side (or the vehicle lower side) on progression towards the vehicle front side, the cross-sectional area of the reinforcing portion as seen in the aforementioned cross-section may be ensured while the height of the reinforcing portion in the vehicle vertical direction is kept low. Due thereto, the reinforcing function of the reinforcing beams may be ensured while the height in the vehicle vertical direction of the reinforcing portions, that obstruct the field of view of the driver, becoming high may be suppressed.

Further, as seen in a cross-section viewed from the vehicle transverse direction inner side, the upper surface and the lower surface of the reinforcing portion are inclined toward the vehicle lower side on progression towards the vehicle longitudinal direction outer side (the vehicle front side at a front pillar portion, and the vehicle rear side at a rear pillar portion). Therefore, at the reinforcing portions that are disposed further toward the vehicle lower side than the eye point of the driver, the upper surfaces and the lower surfaces of the reinforcing portions can be set substantially parallel to the field of view of the driver. Due thereto, the visibility of the driver, at the time when the driver views the vehicle outer side through the peripheries of the reinforcing portions that are disposed further toward the lower side than the eye point of the driver, may be improved.

A second aspect, in the above first aspect, as seen in a cross-section viewed from the vehicle transverse direction inner side, the reinforcing portions may be disposed so as to be inclined toward a vehicle longitudinal direction inner side on progression towards a vehicle upper side.

In the vehicle pillar structure of the second aspect, as seen in a cross-section viewed from the vehicle transverse direction inner side, the reinforcing portions are disposed so as to be inclined toward the vehicle longitudinal direction inner side (the vehicle rear side at a front pillar portion, and the vehicle front side at a rear pillar portion), on progression towards the vehicle upper side. Further, the pillar portion is generally disposed so as to be inclined toward the vehicle longitudinal direction inner side on progression towards the vehicle upper side. Therefore, the vehicle longitudinal direction outer side surfaces of the reinforcing portions can be disposed parallel to the vehicle outer side surface of the pillar portion. Due thereto, the reinforcing portions extend along the surface at the vehicle outer side of the pillar portion, and therefore, the design of the vehicle may be improved.

A third aspect, in the above aspects, the transparent portions may be configured by a glass fiber reinforced resin, and the side portions and the reinforcing portions may be configured by a carbon fiber reinforced resin; and the entire reinforcing portions may be embedded in the transparent portion.

In the vehicle pillar structure of the third aspect, the transparent portions are configured by a glass fiber reinforced resin, and the side portions and the reinforcing portions are configured by a carbon fiber reinforced resin. Therefore, the transparent portions, and the side portions and the reinforcing portions, can easily be made to be integral. Further, because the entire reinforcing portions are embedded in the transparent portion, the vehicle outer side surface (i.e., the design surface) of the transparent portion can be configured from only the transparent material. Therefore, the design of the vehicle may be improved effectively.

In accordance with the vehicle pillar structure of the first aspect, the visibility of the driver through the pillar portion may be improved while the pillar portion may be reinforced.

In accordance with the vehicle pillar structures of the second and third aspects, the design of the vehicle may be improved.

BRIEF DESCRIPTION OF THE DRAWINGS

Exemplary embodiments will be described in detail based on the following figures, wherein.

DETAILED DESCRIPTION

Figure 1:
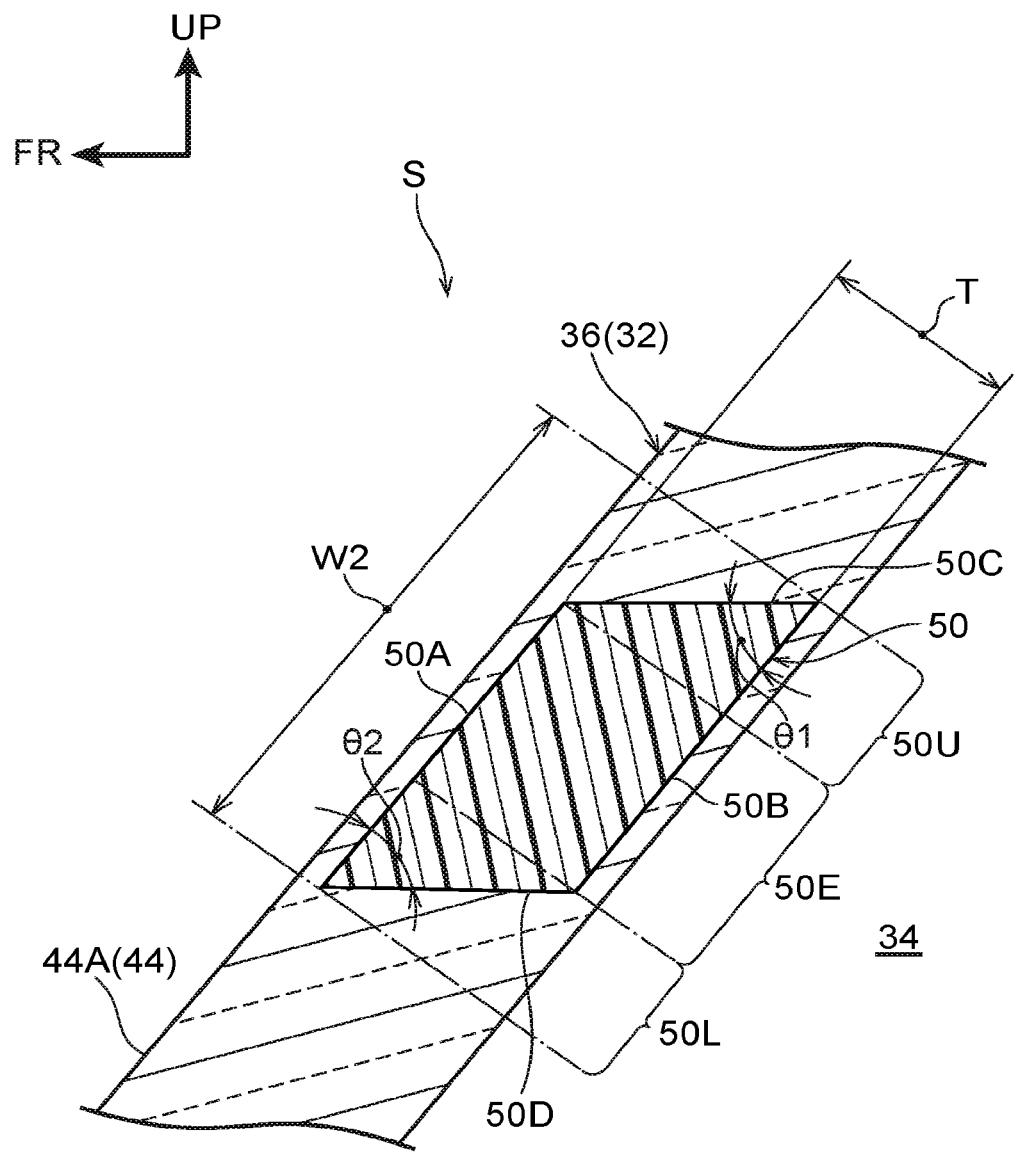
FIG. 1 is a cross-sectional view (a cross-sectional view along line 1-1 of FIG. 4) seen from a vehicle transverse direction inner side and shows a reinforcing beam of a front pillar to which a vehicle pillar structure of a present embodiment is applied.

A vehicle pillar structure S of a present embodiment is described hereinafter by using the drawings. Note that, in the drawings, arrow FR that is shown appropriately indicates the vehicle front side of a vehicle (automobile) V that is equipped with a front pillar 30 to which the vehicle pillar structure S is applied, arrow UP indicates the vehicle upper side, and arrow RH indicates the vehicle right side. Hereinafter, when description is given by using merely longitudinal, vertical and left-right directions, they refer to the longitudinal of the vehicle longitudinal direction, the vertical of the vehicle vertical direction and the left and right of the vehicle left-right direction (the vehicle transverse direction) unless otherwise indicated.

First, the schematic configuration of the automobile V will be described hereinafter. The front portion of a cabin C interior (vehicle cabin interior) at the automobile V is shown in a schematic plan view in FIG. 2. As shown in this drawing, a vehicle seat 10 for the driver is disposed at the right side portion of the front portion of the cabin C. This vehicle seat 10 is configured to include a seat cushion 10A on which a vehicle occupant P (hereinafter called driver P) sits, and a seatback 10B that supports the back portion of the driver P. The lower end portion of the seatback 10B is connected to the rear end portion of the seat cushion 10A.

Further, a vehicle seat 12 for the front passenger is disposed at the left side portion of the front portion of the cabin C. In the same way as the vehicle seat 10, the vehicle seat 12 is configured to include a seat cushion 12A and a seatback 12B. Due thereto, the automobile V is a right-hand drive vehicle.

A windshield glass 14 (hereinafter called "WS glass 14") is provided at the front end portion of the cabin C of the automobile V. This WS glass 14 is formed in the plate-shaped and is transparent, and is disposed so as to be inclined toward the rear side on progression towards the upper side as seen in a side view (see FIG. 3). Further, the WS glass 14 is formed in a curved shape in which the vehicle transverse direction central portion thereof slightly bulges-out convexly toward the front side. Vehicle transverse direction outer side end portions 14A of the WS glass 14 are held by pillar portions 32 of the front pillars 30 that are described later. Further, the lower end portion of the WS glass 14 is fixed by an adhesive (not shown) to a cowl 16 that extends along the vehicle transverse direction. Note that the cowl 16 is disposed along the upper end portion of an unillustrated dash panel that configures the front portion of the cabin C. Further, at the front end portion of a roof 18 that configures the upper portion of the cabin C, the upper end portion of the WS glass 14 is fixed by an adhesive (not shown) to a front header 20 that is disposed along the vehicle transverse direction.

Figure 3:
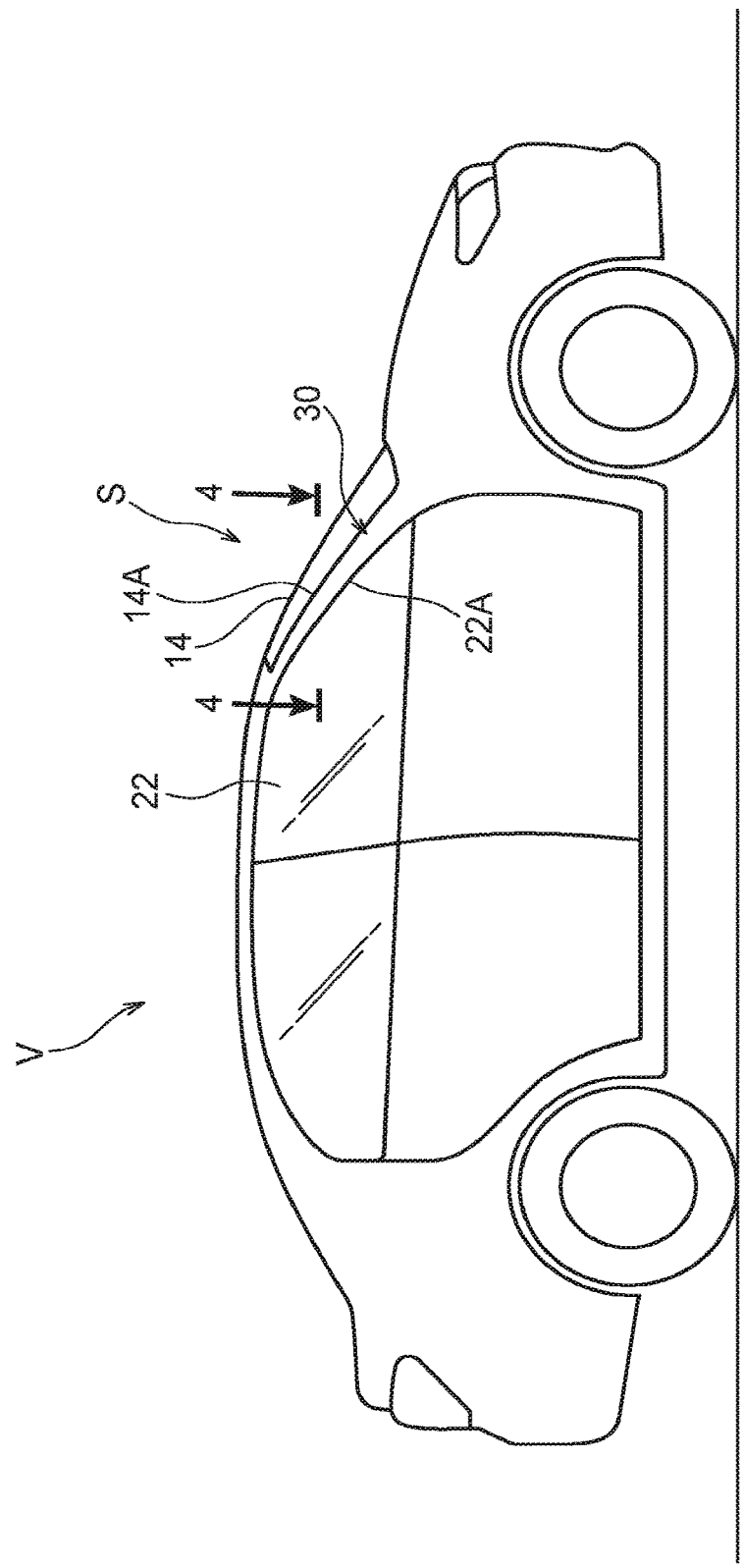
FIG. 3 is a side view seen from a right side and shows the entire automobile of FIG. 2.

Further, as shown in FIG. 3, a side door glass 22 that is plate-shaped and is transparent, is provided at the side portion of the cabin C. The front pillar 30 is disposed between a front end portion 22A of the side door glass 22 and the vehicle transverse direction outer side end portion 14A of the WS glass 14.

Figure 2:
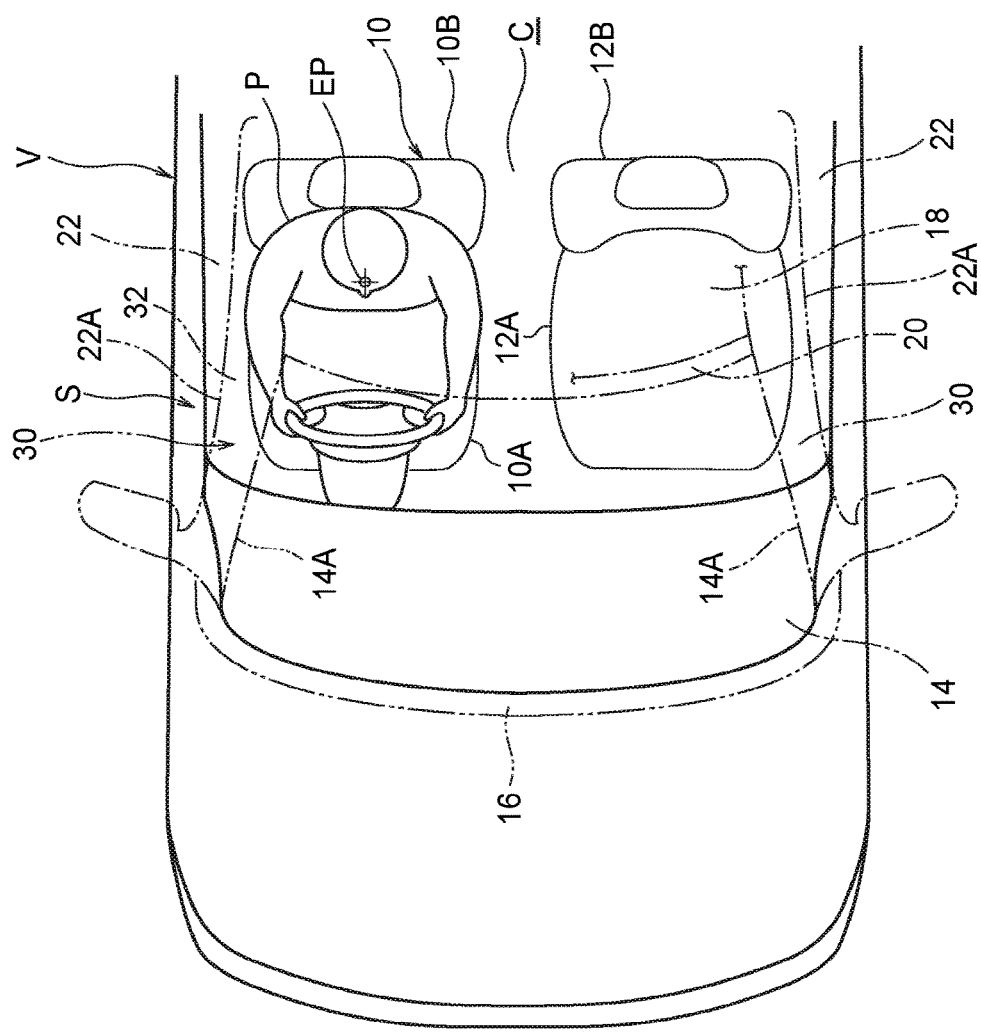
FIG. 2 is a schematic plan view showing the front portion of a cabin interior of an automobile that has the front pillar of FIG. 1.

Next, the front pillar 30 that is the main portion of the present disclosure is described. As shown in FIG. 2, the front pillars 30 are disposed respectively at the vehicle transverse direction both sides of the WS glass 14 that is disposed at the front portion of the cabin C. Therefore, in the present embodiment, the vehicle front side corresponds to the "vehicle longitudinal direction outer side" in the present disclosure, and the vehicle rear side corresponds to the "vehicle longitudinal inner side" in the present disclosure. Further, the vehicle pillar structure S of the present embodiment is applied to the front pillar 30 at the driver's seat side (the right side). Therefore, in the following explanation, description will be given mainly of the front pillar 30 at the right side.

The front pillar 30 is made of resin. Further, the front pillar 30 has the pillar portion 32 that is formed in the shape of a hollow pillar, and the pillar portion 32 is disposed at the vehicle transverse direction outer side of the WS glass 14 and extends along the vehicle transverse direction outer side end portion 14A of the WS glass 14. Further, the upper end portion of the pillar portion 32 is fixed to the front header 20 via a bracket and the like. The lower end portion of the pillar portion 32 is fixed to the upper end portion of a front pillar lower (not illustrated) that is made of metal and extends substantially in the vertical direction.

As described above, the pillar portion 32 extends along the vehicle transverse direction outer side end portion 14A of the WS glass 14. Therefore, the pillar portion 32 is disposed so as to be inclined toward the rear side on progression towards the upper side as seen in a side view, and is disposed at the front side and the vehicle transverse direction outer side (the right side) as seen from the driver P. Due thereto, the field of view of the driver P at the front side and the vehicle transverse direction outer side with respect to the pillar portion 32 is blocked by the pillar portion 32. However, as will be described later, the pillar portion 32 has transparent portions 44 (see FIG. 4) that are formed of a transparent resin material, and therefore, is configured such that the driver P can see the vehicle outer side through the transparent portions 44.

Figure 4:
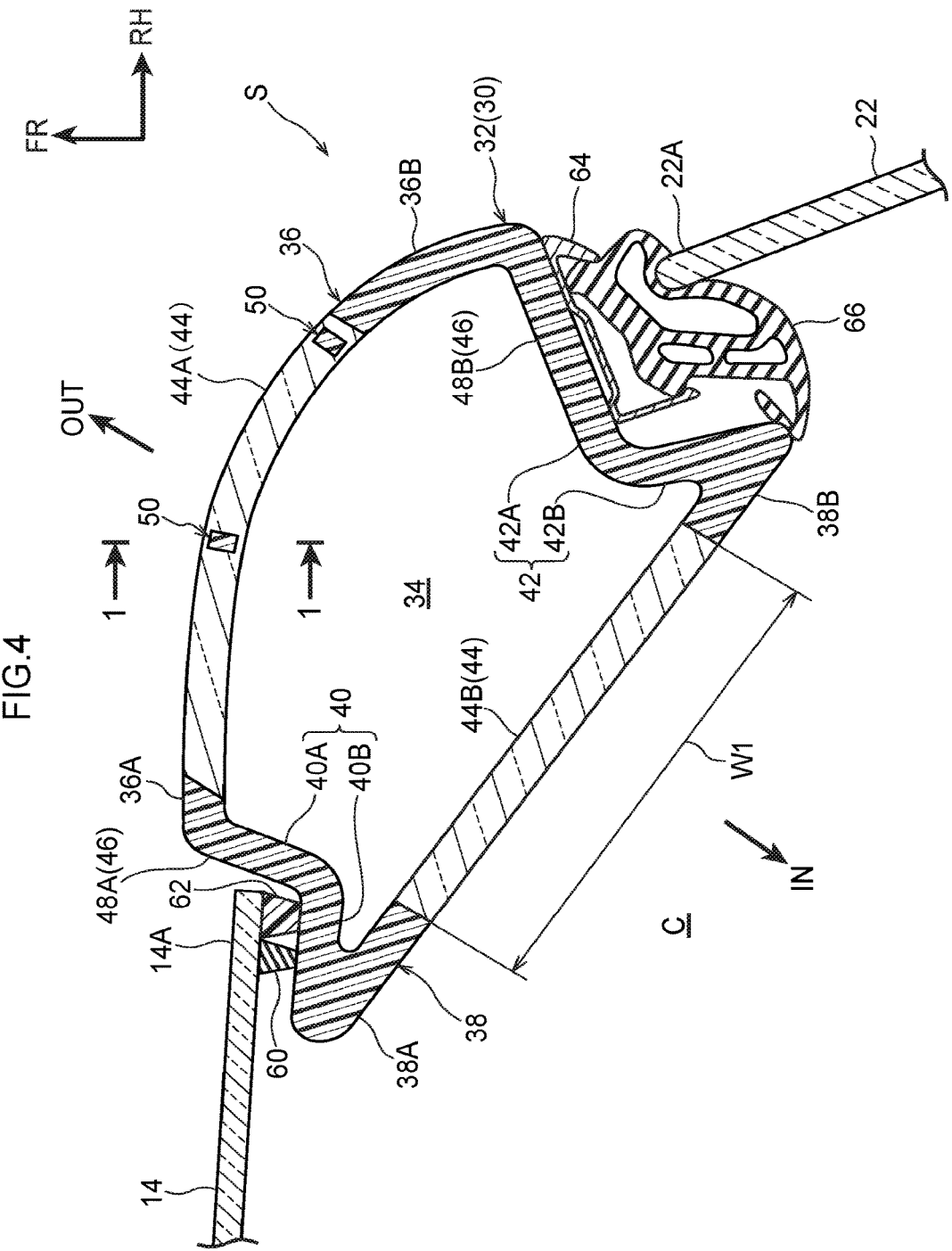
FIG. 4 is a plan sectional view (a cross-sectional view along line 4-4 of FIG. 3) seen from a vehicle upper side and shows the pillar portion of FIG. 3.

As shown in FIG. 4, as seen in a plan sectional view, the pillar portion 32 is configured as a hollow structure that has a closed cross-section 34 that is substantially oval and whose length direction is substantially the vehicle transverse direction. Namely, the pillar portion 32 includes an outer side wall 36 that configures the wall portion at the vehicle outer side of the pillar portion 32, and an inner side wall 38 that configures the wall portion at the cabin C side of the pillar portion 32. Further, the pillar portion 32 has a first side wall 40 and a second side wall 42 that connect the outer side wall 36 and the inner side wall 38. In the present exemplary embodiment, the general plate thickness of the pillar portion 32 is set to be 5 mm as an example.

As seen in a plan sectional view, the outer side wall 36 is formed in the shape of a curved surface that slightly bulges-out convexly toward the vehicle outer side (in detail, toward an oblique front right side). On the other hand, as seen in a plan sectional view, the inner side wall 38 is disposed with an incline and substantially rectilinearly toward the rear side on progression towards the vehicle transverse direction outer side.

Further, as seen in a plan sectional view, the first side wall 40, that configures the vehicle transverse direction inner side (in other words, the WS glass 14 side) portion of the pillar portion 32, is formed in a substantially backwards L-shape that opens toward the front side and the vehicle transverse direction inner side. The wall portion, that is connected to the outer side wall 36 (the wall portion that configures the vehicle outer side portion), at the first side wall 40 is a first outer side wall 40A, and the wall portion, that is connected to the inner side wall 38 (the wall portion that configures the cabin C side portion), at the first side wall 40 is a first inner side wall 40B. The first outer side wall 40A is disposed, at the vehicle transverse direction outer side with respect to the WS glass 14, such that the plate thickness direction thereof is a direction that is substantially orthogonal to the plate thickness direction of the WS glass 14, as seen in a plan sectional view. In other words, the first outer side wall 40A is disposed substantially parallel to the end surface of the vehicle transverse direction outer side end portion 14A of the WS glass 14. On the other hand, the first inner side wall 40B is disposed at the cabin C side (the rear side) with respect to the vehicle transverse direction outer side end portion 14A of the WS glass 14, and is disposed so as to face the WS glass 14 in the plate thickness direction of the WS glass 14.

An adhesive 60 such as a urethane sealant or the like is directly applied to the surface, that faces the WS glass 14, of the first inner side wall 40B. The vehicle transverse direction outer side end portion 14A of the WS glass 14 is held at the first inner side wall 40B via this adhesive 60. The adhesive 60 is stretchable, and, by sealing the region between the WS glass 14 and the front pillar 30 and utilizing the stretchability, the difference in expansion/contraction between the WS glass 14 and the front pillar 30 due to changes in the air temperature is absorbed. Moreover, between the vehicle transverse direction outer side end portion 14A of the WS glass 14 and the first inner side wall 40B, a molding 62 is disposed at a position that is at the vehicle transverse direction outer side with respect to the adhesive 60. Further, the region between the WS glass 14 and the first inner side wall 40B is filled-in by this molding 62.

On the other hand, the second side wall 42, that configures the vehicle transverse direction outer side (i.e., the side door glass 22 side) portion of the pillar portion 32 is formed in a substantial L-shape that opens toward the rear side and the vehicle transverse direction outer side as seen in a plan sectional view. In other words, the second side wall 42 projects toward the inner side of the closed cross-section 34 of the pillar portion 32 with respect to the vehicle transverse direction outer side ends of the outer side wall 36 and the inner side wall 38. Further, the wall portion, that is connected to the outer side wall 36, at the second side wall 42 is a second outer side wall 42A, and the wall portion, that is connected to the inner side wall 38, at the second side wall 42 is a second inner side wall 42B.

A retainer 64, that is formed by a strip-shaped stainless steel or the like being bent, is provided at the second side wall 42. The retainer 64 is formed in a substantial U-shape that opens toward the vehicle transverse direction outer side and rear side as seen in a plan sectional view. Further, the bottom wall of the retainer 64 is fixed to the second outer side wall 42A by unillustrated fastening members such as screws or the like. A door seal 66 is mounted to the retainer 64. This door seal 66 is formed by an elastic member of ethylene propylene rubber (EPDM) or the like. Due thereto, configuration is made in which the door seal 66 is held at the second side wall 42 via the retainer 64, and the front end portion 22A of the side door glass 22 is held at the second side wall 42 via the door seal 66.

Here, the front pillar 30 (the pillar portion 32) includes the transparent portions 44, that are configured by a transparent material (in the present embodiment, a glass fiber reinforced resin, e.g., a polycarbonate containing glass fibers and having a bending strength of 120 MPa), and opaque portions 46, that are configured by an opaque material (in the present embodiment, a carbon fiber reinforced resin, e.g., a polycarbonate containing carbon fibers and having a bending strength of 400 MPa).

Namely, the transparent portion 44 configures the transverse direction intermediate portion at the outer side wall 36 (Namely, the portion other than a vehicle transverse direction inner side end portion 36A and a vehicle transverse direction outer side end portion 36B of the outer side wall 36). The transparent portion 44 that is formed at this outer side wall 36 is an outer side transparent portion 44A. The outer side transparent portion 44A extends along the entire length direction of the pillar portion 32. Further, the transparent portion 44 configures the transverse direction intermediate portion at the inner side wall 38 (Namely, the portion other than a vehicle transverse direction inner side end portion 38A and a vehicle transverse direction outer side end portion 38B of the inner side wall 38). The transparent portion 44 that is formed at this inner side wall 38 is an inner side transparent portion 44B. The inner side transparent portion 44B extends along the entire length direction of the pillar portion 32.

Further, at the pillar portion 32, the portions other than the outer side transparent portion 44A and the inner side transparent portion 44B are the opaque portions 46, and the outer side transparent portion 44A and the inner side transparent portion 44B and the opaque portions 46 are formed integrally. Namely, a side portion 48A at the vehicle transverse direction inner side of the pillar portion 32 (in detail, the portion configured by the first side wall 40, the vehicle transverse direction inner side end portion 36A of the outer side wall 36, and the vehicle transverse direction inner side end portion 38A of the inner side wall 38) and a side portion 48B at the vehicle transverse direction outer side of the pillar portion 32 (in detail, the portion configured by the second side wall 42, the vehicle transverse direction outer side end portion 36B of the outer side wall 36, and the vehicle transverse direction outer side end portion 38B of the inner side wall 38) are configured as the opaque portions 46.

The outer side transparent portion 44A and the inner side transparent portion 44B are disposed so as to overlap one another as seen from the driver P. Namely, in a plan sectional view at the position of an eye point EP of the driver P (as shown in FIG. 2, a middle point between the both eyes of the driver P, the central point of the line that connects the both eyes of the driver P), the outer side transparent portion 44A and the inner side transparent portion 44B are disposed so as to face one another in the direction in which the eye point EP and the pillar portion 32 face one another (refer to the arrow OUT direction and the arrow IN direction shown in FIG. 4). Due thereto, the driver P can view the vehicle outer side through the outer side transparent portion 44A and the inner side transparent portion 44B. Note that the position of the eye point EP of the driver P is set on the basis of the position of the eye point EP of a dummy who is seated in the vehicle seat 10 and is in a driving posture, by using a dummy for example (as an example, an AM 50 dummy that covers 50% from the small side of physiques of European and American males). Further, FIG. 4 is drawn as a plan sectional view at the position of the eye point EP of the driver P. Moreover, the transmittance of visible light at the outer side wall 36 (the outer side transparent portion 44A) and the inner side wall 38 (the inner side transparent portion 44B) that are formed of a glass fiber reinforced resin is set to be greater than or equal to 50% as an example, in order for the driver P to be able to see the vehicle outer side through the pillar portion 32. On the other hand, the transmittance of visible light at the opaque portions 46 that are configured by a carbon fiber reinforced resin is set to be less than 50% as an example. Further, in a plan sectional view at the position of the eye point EP of the driver P, transverse dimension W1 between the outer side transparent portion 44A and the inner side transparent portion 44B (the dimension in the direction along the direction that is orthogonal to the direction in which the eye point EP of the driver P and the pillar portion 32 face one another) is set to be 65 mm as an example.

Reinforcing beams 50 that serve as "reinforcing portions" are formed integrally with the outer side wall 36 of the pillar portion 32, and the reinforcing beams 50 are embedded in the outer side wall 36. The reinforcing beams 50 are bridged between the side portion 48A and the side portion 48B of the pillar portion 32 (Namely, between the vehicle transverse direction inner side end portion 36A and the vehicle transverse direction outer side end portion 36B of the outer side wall 36), and extend substantially rectilinearly along the surface at the vehicle outer side of the outer side wall 36 (see FIG. 5). Further, the reinforcing beams 50 are configured by a carbon fiber reinforced resin that is the same black color (opaque) as that of the carbon fiber reinforced resin that configures the side portion 48A and the side portion 48B of the pillar portion 32. Namely, the reinforcing beams 50 are configured by a material that has higher bending strength than the outer side wall 36 (the outer side transparent portion 44A) and the inner side wall 38 (the inner side transparent portion 44B). Further, the shape of the reinforcing beam 50 (width dimension W2 in the extending direction (see FIG. 1) and thickness dimension T (see FIG. 2) and the like) are set by using a method such as topological analysis or the like, and the thickness dimension T of the reinforcing beam 50 is set to be 4 mm as an example.

Moreover, as shown in FIG. 1, the cross-section of the reinforcing beam 50 as seen from the vehicle transverse direction inner side is formed in a quadrangular shape (in further detail, a diamond shape). Namely, the reinforcing beam 50 has a front surface (vehicle longitudinal direction outer side surface) 50A that is disposed parallel to the surface of the outer side wall 36 (i.e., the outer side transparent portion 44A), and a rear surface (vehicle longitudinal direction inner side surface) 50B that is disposed parallel to the front surface 50A. The front surface 50A and the rear surface 50B are disposed at an incline toward the rear side on progression towards the upper side. Further, the reinforcing beam 50 has an upper surface 50C that extends-out from the upper end of the rear surface 50B toward the front side along the vehicle longitudinal direction, and a lower surface 50D that extends-out from the lower end of the front surface 50A toward the rear side along the vehicle longitudinal direction. Namely, as seen in a cross-section viewed from the vehicle transverse direction inner side, the upper surface 50C and the lower surface 50D are disposed in parallel, and angle θ1, that is formed by the upper surface 50C and the rear surface 50B, and angle θ2, that is formed by the lower surface 50D and the front surface 50A, are set to be acute angles.

Further, as seen in a cross-section viewed from the vehicle transverse direction inner side, the thickness direction of the reinforcing beam 50 is the direction orthogonal to the front surface 50A. Due thereto, the thickness dimension T of an upper end portion 50U at the reinforcing beam 50 (the portion shown in FIG. 1 that is further toward the upper end side of the pillar portion 32 than the one-dot chain line that passes-through the upper end of the front surface 50A and extends along the thickness direction of the reinforcing beam 50), is set so as to become smaller on progression towards the upper end side of the reinforcing beam 50. Further, the thickness dimension T of a lower end portion 50L at the reinforcing beam 50 (the portion shown in FIG. 1 that is further toward the lower end side of the pillar portion 32 than the one-dot chain line that passes-through the lower end of the rear surface 50B and extends along the thickness direction of the reinforcing beam 50), is set so as to become smaller on progression towards the lower end side of the reinforcing beam 50. Namely, the thickness dimension T of a vertical direction intermediate portion 50E at the reinforcing beam 50 (the portion other than the upper end portion 50U and the lower end portion 50L) is set to be larger than the thickness dimensions T of the upper end portion 50U and the lower end portion 50L at the reinforcing beam 50.

Operation of the vehicle pillar structure S of the present embodiment are described next.

In the vehicle pillar structure S configured as described above, the front pillar 30 has the pillar portion 32, and the pillar portion 32 extends along the vehicle transverse direction outer side end portion 14A of the WS glass 14. Due thereto, the pillar portion 32 is disposed at the front side and the vehicle transverse direction outer side with respect to the driver P, and therefore, the field of view of the driver P at the front side and the vehicle transverse direction outer side with respect to the pillar portion 32 is blocked.

To address this, the outer side transparent portion 44A that is formed of a transparent material is formed at the outer side wall 36 of the pillar portion 32, and the inner side transparent portion 44B that is formed of a transparent material is formed at the inner side wall 38. The outer side transparent portion 44A and the inner side transparent portion 44B are disposed so as to overlap one another as seen from the driver P. Therefore, the driver P can view the vehicle outer side through the pillar portion 32 (the outer side transparent portion 44A and the inner side transparent portion 44B).

The side portion 48A and the side portion 48B of the pillar portion 32 are made to be the opaque portions 46 that are formed of an opaque resin material. Moreover, the reinforcing beams 50 that extend along the surface of the outer side wall 36 are bridged between the side portion 48A and the side portion 48B (in detail, between the vehicle transverse direction inner side end portion 36A and the vehicle transverse direction outer side end portion 36B of the outer side wall 36), and the reinforcing beams 50 are formed integrally with the outer side transparent portion 44A. Due thereto, the pillar portion 32 is reinforced by the reinforcing beams 50.

Here, as seen from the vehicle transverse direction inner side, the cross-sectional shape of the reinforcing beam 50 is formed in a quadrangular shape, and the upper surface 50C and the lower surface 50D of the reinforcing beam 50 extend along the vehicle longitudinal direction. Therefore, as compared with a case in which the upper surface 50C and the lower surface 50D were to be inclined toward the upper side (or the lower side) on progression towards the front side as seen in a cross-sectional view viewed from the vehicle transverse direction inner side, the cross-sectional area of the reinforcing beam 50 in the aforementioned cross-sectional view may be ensured while the height of the reinforcing beam 50 in the vertical direction is set to be low. Due thereto, the reinforcing function of the reinforcing beam 50 may be ensured while the height in the vertical direction of the reinforcing beam 50, that obstructs the field of view of the driver P, becoming high may be suppressed.

Figure 6:
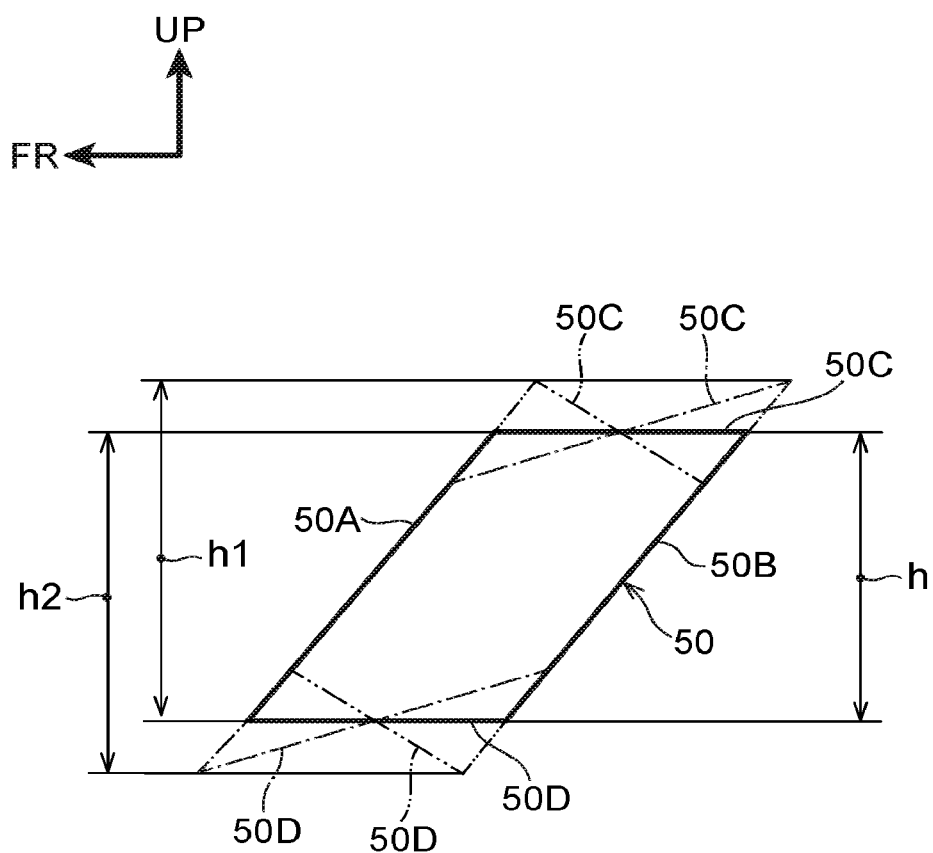
FIG. 6 is an explanatory drawing for explaining the relationship between the height and the cross-sectional area of the reinforcing beam of FIG. 1.

Namely, as in Comparative Example 1 that is shown by the two-dot chain lines in FIG. 6, if the upper surface 50C were to be inclined toward the upper side on progression towards the front side, the cross-sectional area of the reinforcing beam 50 would be substantially the same surface area as in the present embodiment, but the upper end of the front surface 50A would be disposed further toward the upper side than in the present embodiment. Further, similarly, if the lower surface 50D were to be inclined toward the upper side on progression towards the front side, the cross-sectional area of the reinforcing beam 50 would be substantially the same surface area as in the present embodiment, but the lower end of the rear surface 50B would be disposed further toward the lower side than in the present embodiment. Therefore, heights h1, h2 of the reinforcing beam 50 of Comparative Example 1 in the vertical direction are higher than height h of the reinforcing beam 50 of the present embodiment.

On the other hand, as in Comparative Example 2 that is shown by the one-dot chain line in FIG. 6, even if the upper surface 50C were to be inclined toward the lower side on progression towards the front side, the cross-sectional area of the reinforcing beam 50 would be substantially the same surface area as in the present embodiment, but the upper end of the rear surface 50B would be disposed further toward the upper side than in the present embodiment. Further, similarly, if the lower surface 50D were to be inclined toward the lower side on progression towards the front side, the cross-sectional area of the reinforcing beam 50 would be substantially the same surface area as in the present embodiment, but the lower end of the front surface 50A would be disposed further toward the lower side than in the present embodiment. Therefore, the heights h1, h2 of the reinforcing beam 50 of Comparative Example 2 are higher than the height h of the reinforcing beam 50 of the present embodiment.

In contrast, in the present embodiment, as described above, the upper surface 50C and the lower surface 50D of the reinforcing beam 50 extend along the vehicle longitudinal direction as seen in a cross-section viewed from the vehicle transverse direction inner side. Therefore, the cross-sectional area of the reinforcing beam 50 can be ensured, while the height h of the reinforcing beam 50 in the vertical direction is set to be low as compared with the heights h1, h2 of the reinforcing beam 50 in above-described Comparative Example 1 and Comparative Example 2. Due thereto, the reinforcing function of the reinforcing beam 50 may be ensured while the height in the vertical direction of the reinforcing beam 50, that blocks the field of view of the driver P, becoming high may be suppressed. Due to the above, even in a case in which the reinforcing beams 50 that reinforce the pillar portion 32 are provided, the visibility of the driver P through the pillar portion 32 may be improved while the reinforcing effect of the reinforcing beams 50 is maintained.

Further, at the pillar portion 32, the thickness of the upper end portion 50U and the lower end portion 50L at the reinforcing beam 50 are set to be thin as compared with the thickness of the vertical direction intermediate portion 50E. Moreover, the thickness of the upper end portion 50U of the reinforcing beam 50 is set to become thinner on progression towards the upper end side, and the thickness of the lower end portion 50L of the reinforcing beam 50 is set so as to become thinner on progression towards the lower end side. Therefore, in a vicinity of the upper end and in a vicinity of the lower end of the reinforcing beam 50, configurations are made such that light incident from the front upper side are transmitted through. Due thereto, the contours of the upper ends and the lower ends of the reinforcing beams 50 can be blurred. As a result, when the driver P looks at the vehicle outer side through the peripheries of the reinforcing beams 50, the effects of the reinforcing beams 50 on the visibility of the driver P may be reduced. Accordingly, the visibility of the driver P may be improved more.

Further, at the pillar portion 32, the reinforcing beams 50 are inclined toward the rear side on progression towards the upper side, as seen in a cross-section viewed from the vehicle transverse direction inner side. Therefore, the front surfaces 50A of the reinforcing beams 50 can be disposed parallel to the surface of the outer side wall 36. Due thereto, the reinforcing beams 50 can be made to extend along the surface (i.e., the design surface) at the vehicle outer side of the outer side wall 36. Accordingly, the design of the front pillar 30 may be improved.

Further, at the pillar portion 32, the transparent portions 44 (the outer side transparent portion 44A, the inner side transparent portion 44B) are configured by a glass fiber reinforced resin, and the opaque portions (the side portion 48A, the side portion 48B) and the reinforcing beams 50 are configured by a carbon fiber reinforced resin. Therefore, the transparent portions 44, the opaque portions 46 and the reinforcing beams 50 can easily be made to be integral. Further, the entireties of the reinforcing beams 50 are embedded in the outer side transparent portion 44A. Thus, the vehicle outer side surface of the outer side transparent portion 44A can be configured by a transparent material only. Accordingly, this may contribute to improve the design of the automobile V.

Note that, in the present embodiment, the upper surface 50C and the lower surface 50D of the reinforcing beam 50 extend along the vehicle longitudinal direction as seen in a cross-section viewed from the vehicle transverse direction inner side. Instead, the upper surface 50C and the lower surface 50D of the reinforcing beam 50 may be inclined toward the lower side on progression towards the front side, as seen in a cross-section viewed from the vehicle transverse direction inner side. In this case, as described above, the height of the reinforcing beam 50 in the vertical direction is high as compared with in the present embodiment, but, at the reinforcing beams 50 that are disposed further toward the lower side than the eye point EP of the driver P, the visibility of the driver P may be improved.

Figure 5:
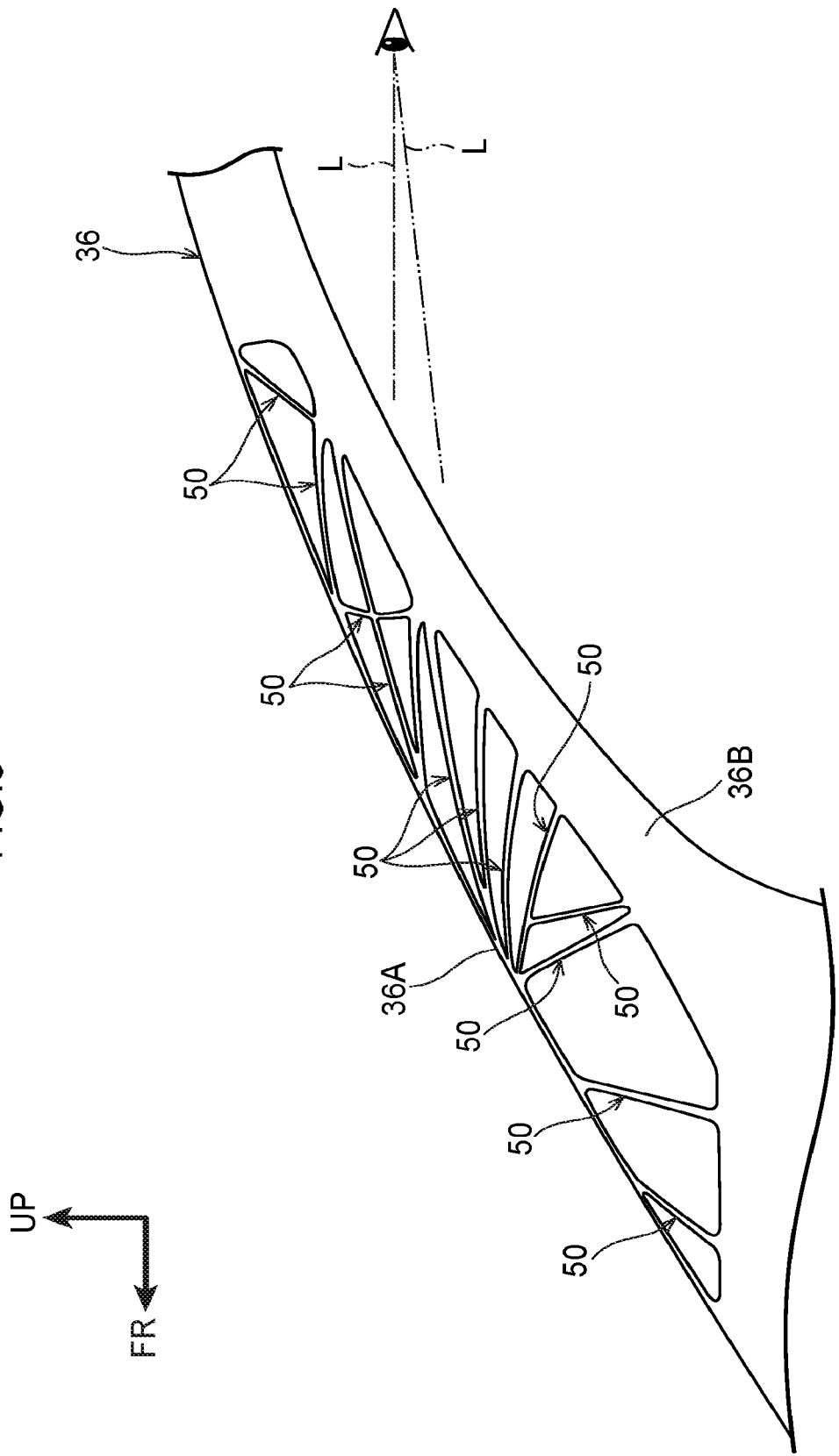
FIG. 5 is a side view seen from the vehicle transverse direction inner side and schematically shows an outer side wall and the reinforcing beams of FIG. 4.

Namely, as shown in FIG. 5, when the driver P views the vehicle outer side through the peripheries of the reinforcing beams 50 that are disposed further toward the lower side than the eye point EP of the driver P (the reinforcing beams 50 that are disposed further toward the lower side than a sight line L of the driver P that is shown by the one-dot chain line in FIG. 5), as seen from the vehicle transverse direction inner side, the sight line L of the driver P (refer to the sight line L that is shown by the two-dot chain line in FIG. 5) is inclined toward the lower side on progression towards the front side. Therefore, by making the upper surface 50C and the lower surface 50D be inclined toward the lower side on progression towards the front side as seen in a cross-section viewed from the vehicle transverse direction inner side, the upper surface 50C and the lower surface 50D can be set substantially parallel to the sight line L of the driver P. Due thereto, although the height of the reinforcing beam 50 in the vertical direction is high as compared with in the present embodiment, the visibility of the driver P, at the time when the driver P views the vehicle outer side through the peripheries of the reinforcing beams 50 that are disposed further toward the lower side than the eye point EP of the driver P, can be improved. Further, usually, the head portion of the driver P is disposed further toward the rear side than the upper portion of the pillar portion 32 (the portion that is further toward the upper side than the length direction central portion of the pillar portion 32). Therefore, there is the tendency for the ratio of the reinforcing beams 50, that are disposed further toward the lower side than the eye point EP of the driver P, with respect to all of the reinforcing beams 50 that are formed at the pillar portion 32, to become large. Accordingly, by making the upper surface 50C and the lower surface 50D be inclined toward the lower side on progression towards the front side as seen in a cross-section viewed from the vehicle transverse direction inner side, the visibility of the driver P can be effectively improved.

Further, in a case in which the upper surface 50C and the lower surface 50D are inclined toward the lower side on progression towards the front side as seen in a cross-section viewed from the vehicle transverse direction inner side, the upper surface 50C and the lower surface 50D of the reinforcing beam 50 may be inclined in rectilinear shapes. Further, as seen in a cross-section viewed from the vehicle transverse direction inner side, the upper surface 50C of the reinforcing beam 50 may be inclined in a curved shape that is convex toward an obliquely rear lower side, and/or the lower surface 50D of the reinforcing beam 50 may be inclined in a curved shape that is convex toward an obliquely front upper side. Further, in a case in which the upper surface 50C (the lower surface 50D) is inclined in a curved shape, the thicknesses of the upper end portion 50U and the lower end portion 50L at the reinforcing beam 50 can be set to be thin, as compared with a case in which the upper surface 50C (the lower surface 50D) is inclined rectilinearly. Therefore, the contours of the upper ends and the lower ends of the reinforcing beams 50 can be blurred more. As a result, when the driver P views the vehicle outer side through the peripheries of the reinforcing beams 50, the effects of the reinforcing beams 50 on the visibility of the driver P can be reduced more.

Further, in the present embodiment, the reinforcing beams 50 are formed at the outer side wall 36. However, the reinforcing beams 50 may be formed also at the inner side wall 38, in the same way as at the outer side wall 36. Moreover, the reinforcing beams 50 may be formed at only the inner side wall 38.

Further, in the present embodiment, the pillar portion 32 is formed in the shape of a hollow pillar, but the pillar portion 32 may be formed in the shape of a solid pillar. In this case, for example, the outer side transparent portion 44A and the inner side transparent portion 44B may be made to be integral, and the portion that is made integral may be made to be the transparent portion 44.

Further, in the present embodiment, the entireties of the reinforcing beams 50 are embedded in the outer side transparent portion 44A, but the reinforcing beams 50 may be embedded in the outer side transparent portion 44A except for the rear surfaces of the reinforcing beams 50. In this case, the rear surfaces 50B of the reinforcing beams 50 and the inner peripheral surface of the outer side transparent portion 44A (the surface at the closed cross-section 34 side) may be formed to be flush.

Further, in the present embodiment, the outer side transparent portion 44A and the inner side transparent portion 44B are configured by a glass fiber reinforced resin, but the material of the outer side transparent portion 44A and the inner side transparent portion 44B is not limited to this. For example, the outer side transparent portion 44A and the inner side transparent portion 44B may be configured by a transparent resin that does not contain fibers. Further, the outer side transparent portion 44A and the inner side transparent portion 44B may be formed of a ceramic such as glass or the like. In this case, grooves or the like for placement of the reinforcing beams 50 may be formed in the outer side transparent portion 44A, and the reinforcing beams 50 may be placed within these grooves, and the reinforcing beams 50 and the outer side transparent portion 44A may be made integral by an adhesive or the like.

Further, in the present embodiment, the opaque portions 46 are configured by a carbon fiber reinforced resin, but the material of the opaque portions 46 is not limited to this. For example, the opaque portions 46 may be configured by a metal or a ceramic or the like. In this case, the outer side transparent portion 44A, the inner side transparent portion 44B and the reinforcing beams 50 may be made integral with the opaque portions 46 by an adhesive or the like.

Further, the present embodiment describes an example in which the vehicle pillar structure S is applied to the front pillar 30 at the driver's seat side, but application of the vehicle pillar structure S is not limited to this. For example, the vehicle pillar structure S may be applied to the front pillar 30 at the front passenger's seat side. In this case as well, the visibility of the driver through the pillar portion may be improved while the pillar portion is reinforced. Further, for example, although not illustrated, the vehicle pillar structure S may be applied to a rear pillar that is disposed between a rear windshield glass provided at the rear portion of the cabin C, and a side door glass that is provided at a side portion of the cabin C. Due thereto, the visibility of the driver through the pillar portion may be improved while the pillar portion at the rear pillar is reinforced. Note that, in such case, the rear pillar is configures with the respective configuration of the front pillar 30 in which front and rear are reversed. Further, in a case in which the vehicle pillar structure S is applied to a rear pillar, the vehicle rear side corresponds to the "vehicle longitudinal direction outer side" in the present disclosure, and the vehicle front side corresponds to the "vehicle longitudinal direction inner side" in the present disclosure.

Further, in the present embodiment, the vehicle pillar structure S is applied to the automobile V that is a right-hand drive vehicle, but the vehicle pillar structure S may be applied to a left-hand drive automobile.

What is claimed is:

1. A vehicle pillar structure, comprising:
   a pillar portion extending along a vehicle transverse direction outer side end portion of a windshield glass, the pillar portion including:
      a pair of side portions configuring a vehicle transverse direction inner side portion and a vehicle transverse direction outer side portion of the pillar portion and being configured by an opaque material, and
      transparent portions configuring portions of the pillar portion between the pair of side portions and being configured by a transparent material; and
   reinforcing beams configured by an opaque material, spanning between the pair of side portions, formed integrally with the transparent portions, and reinforcing the pillar portion,
   wherein the reinforcing beams have a quadrangular shape in a cross-section of the reinforcing beams from a vehicle transverse direction inner side, and upper surfaces and lower surfaces of the reinforcing beams extend along a vehicle longitudinal direction, or incline toward a vehicle lower side on progression towards a vehicle longitudinal direction outer side.

2. The vehicle pillar structure of claim 1, wherein in the cross-section of the reinforcing beams from the vehicle transverse direction inner side, the reinforcing beams are inclined toward a vehicle longitudinal direction inner side on progression towards a vehicle upper side.

3. The vehicle pillar structure of claim 1, wherein
   the transparent portions are configured by a glass fiber reinforced resin, and the side portions and the reinforcing portions are configured by a carbon fiber reinforced resin; and
   the entire reinforcing beams are embedded in the transparent portion.

4. The vehicle pillar structure of claim 1, wherein
   the reinforcing beams include front surfaces and rear surfaces,
   the respective upper surfaces are parallel to the respective lower surfaces,
   an angle between the respective upper surfaces and the respective rear surfaces is acute, and
   an angle between the respective lower surfaces and the respective front surfaces is acute.

* * * * *